United States Patent [19]
Semerdjian et al.

[11] Patent Number: 6,007,609
[45] Date of Patent: Dec. 28, 1999

[54] PRESSURIZED CONTAINER WITH RESTRICTOR TUBE HAVING MULTIPLE CAPILLARY PASSAGES

[75] Inventors: Roy V. Semerdjian, Sacremento; David A. Le Febre, Camino; Thomas B. Martin, Jr., Placerville, all of Calif.

[73] Assignee: UOP LLC, Des Plaines, Ill.

[21] Appl. No.: 08/993,067

[22] Filed: Dec. 18, 1997

[51] Int. Cl.$^6$ .................................................. B01D 53/04
[52] U.S. Cl. .................................. 96/108; 96/143; 222/3; 222/189.1
[58] Field of Search .............................. 96/108, 130, 142, 96/143; 222/3, 71, 189.06, 189.1

[56] References Cited

U.S. PATENT DOCUMENTS

| | | | |
|---|---|---|---|
| 4,373,938 | 2/1983 | McCombs | 96/130 X |
| 4,738,693 | 4/1988 | Tom | 55/36 |
| 4,744,221 | 5/1988 | Knollmueller | 62/48 |
| 5,092,135 | 3/1992 | Cameron | 96/130 X |
| 5,518,528 | 5/1996 | Tom et al. | 95/103 |
| 5,681,370 | 10/1997 | McMahon | 96/130 X |
| 5,704,965 | 1/1998 | Tom et al. | 96/143 X |
| 5,704,967 | 1/1998 | Tom et al. | 96/143 |
| 5,707,424 | 1/1998 | Tom et al. | 96/143 X |
| 5,761,910 | 6/1998 | Tom | 96/108 X |

*Primary Examiner*—Robert H. Spitzer
*Attorney, Agent, or Firm*—Thomas K. McBride; John G. Tolomei

[57] ABSTRACT

The present invention uses a flow restrictor in the form of a tube containing multiple capillary sized passages to minimize any discharge of toxic gases from compressed gas cylinders in the unlikely event of the control valve or regulator failure. The use of this arrangement to provide a flow restriction in combination with a regulator in the form of dispensing check valve provides a virtually fail safe system for preventing hazardous discharge of fluid from a pressurized cylinder or tank. The multiple capillary passage structure provides carefully sized openings that minimize any discharge of gas. Location of the inlet to the capillary tube at the midpoint of the cylinder can also prevent the discharge of liquid from the cylinder if the control valve system fails. Limiting the accidental discharge of fluid from the cylinder to gas phase fluids greatly reduces the uncontrolled mass flow rate at which fluid can escape from the cylinder. A diaphragm can control the movement of a check valve element to prevent discharge of gas from a tank unless a predetermined vacuum condition exists downstream of the check valve. This system is particularly useful in the delivery of arsine gas and provides multiple safeguards against accidental discharge.

19 Claims, 3 Drawing Sheets

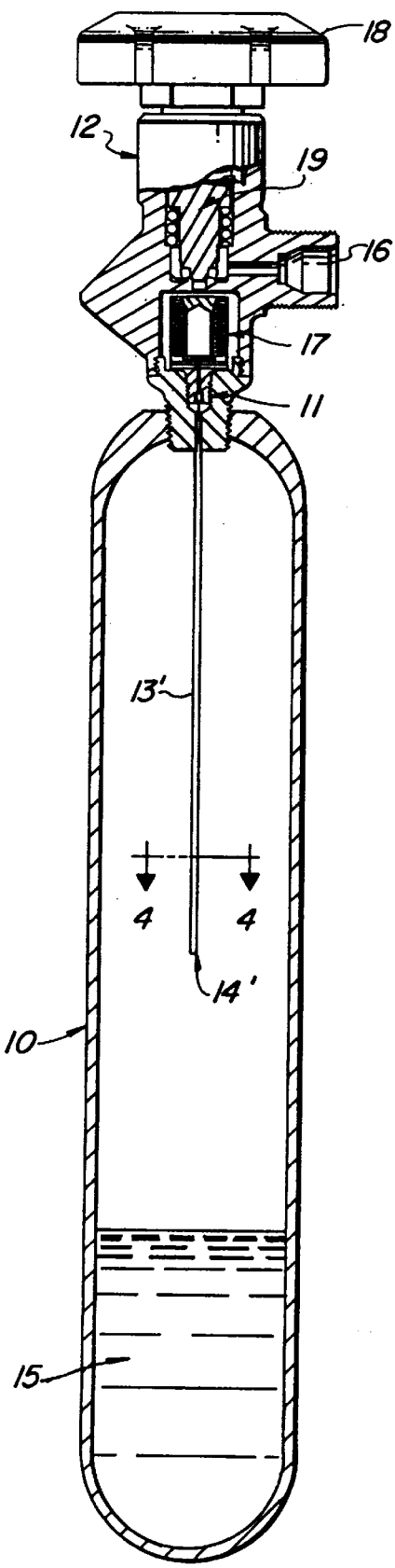
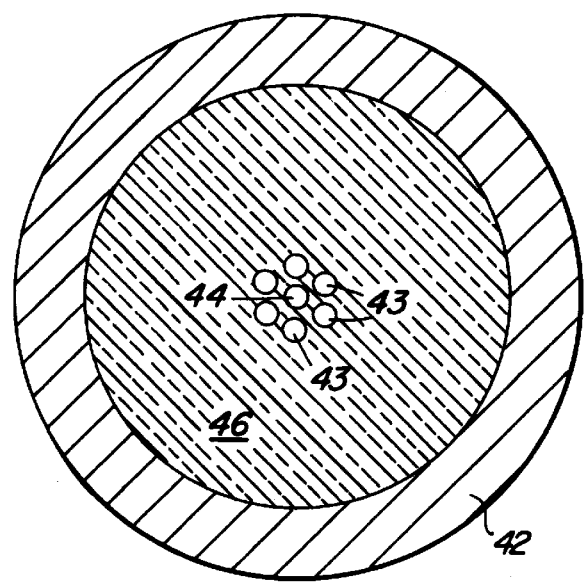

PRESSURIZED CONTAINER WITH RESTRICTOR TUBE HAVING MULTIPLE CAPILLARY PASSAGES

FIELD OF THE INVENTION

This invention relates to the delivery of gases or liquids from storage containers such as pressurized tanks or cylinders. More specifically this invention relates to preventing uncontrolled discharge of gases from such containers.

BACKGROUND OF THE INVENTION

Many industrial processing and manufacturing applications require the use of highly toxic fluids. The manufacture of semiconductor materials represents one such application wherein the safe storage and handling of highly toxic hydridic or halidic gases becomes necessary. Examples of such gases include silane, germane, ammonia, phosphine, arsine, stibine, hydrogen sulfide, hydrogen selenide, hydrogen telluride, and other halide compounds. As a result of toxicity and safety considerations, these gases must be carefully stored and handled in the industrial process facility. The semiconductor industry in particular relies on the gaseous hydrides of arsine ($AsH_3$) and phosphine (PH3) as sources of arsenic (As) and phosphorus (P) in ion implantation. Ion implantation systems typically use dilute mixtures of $AsH_3$ and $PH_3$ at pressures as high as 1500 psig. Due to their extreme toxicity and high vapor pressure, their use, transportation and storage raise significant safety concerns for the semiconductor industry.

Looking at arsine handling as a more specific example of how an extremely toxic gas is used by the semiconductor industry, arsine is typically stored in pressurized containers at about 250 psi. The handling of arsine cylinders in production environments presents a wide variety of hazardous situations. A leak in one 140 gram cylinder of arsine could contaminate the entire volume of a 30,000 square foot building with 10 foot high ceilings to the Immediate Danger to Life and Health (IDLH) level. If the leak were large, this could happen in just a minute or two, which would mean that for many hours there would be extremely deadly concentrations in the area near the source of the spill.

An arsine container typically uses a 500 cc gas cylinder with a valve at one end. Liquid arsine pumped at about 250 psi fills the cylinder to about 20% of its capacity (about 140 grams of arsine). Once filled, the valve is closed and a safety cap is installed on the valve outlet port. The cylinder is light (about 5 pounds) and the valve is strong compared to the weight of the cylinder so that dropping the cylinder onto the valve end from 10 or 20 feet above a concrete floor will not breach the integrity of the valve or cylinder. This strength of these small cylinders eliminates the need for the valve protection that usually appears on larger gas cylinders.

An end-user that receives the container will, in a well ventilated area, remove the safety cap, install the container, usually vertically, on the end-use apparatus, and open the valve. The container then dispenses liquid or gas arsine depending on the position of the valve end. If the valve end is down, arsine liquid will be dispensed. If the valve end is up, arsine gas will be dispensed. Regardless of valve position, end-user apparatus always uses arsine in gas phase whether discharged from the cylinder as a gas or converted from liquid to gas within the end-user apparatus.

The saturation pressure of liquid arsine at room temperature (22° C.) is about 250 psi. This means that any leak in the container to apparatus connections or in the end user apparatus itself will have arsine exiting to atmosphere at 250 psi. Thus, connections that remain absolutely leak tight to 250 psi or better must join all parts of the apparatus and supply container. If the end user were to first open the valve and then remove the safety plug, the entire 140 grams of arsine could spill out in as little as one or two seconds, especially if the valve end were down. Such an event could happen if someone turns the valve handle full open hard with enough torque such that the handle sticks sufficiently to mislead someone else into thinking that the valve was closed. Removal of the safety cap or disconnection of the cylinder under the mistaken belief that the valve was closed could then result in a rapid release of arsine.

In view of the serious potential for injury or death that could result from an unintended release of these fluids, the prior art discloses systems for preventing such catastrophic release of toxic fluids. U.S. Pat. No. 4,744,221 teaches the storing and the subsequent delivery of arsine by contacting arsine at a temperature of from about −30° C. to about +30° C. with a zeolite to adsorb arsine on the zeolite for storage. Heating then dispenses the arsine from the zeolite at an elevated temperature of up to about 175° C. The method of the '221 patent imposes a disadvantageous heating requirement on the arsine delivery. One problem with heating is that the storage vessel typically has a significant heat capacity. The heat capacity of the storage vessel introduces a significant lag time in the dispensing operation. Further, heating can decompose the arsine resulting in the formation of hydrogen gas with its potential explosion hazards. Thermal decomposition of arsine also causes an undesired increase in gas pressure for the process system.

U.S. Pat. No. 5,518,528 provides a system for storage and dispensing of hydridic and halidic gases which operates at ambient temperature by using a pressure reduction to desorb toxic fluids from zeolite materials having high storage (sorptive) capacity for these gases. The '528 patent uses a dispensing assembly to provide a pressure below the interior pressure of the storage vessel. The reduced pressure desorbs the sorbate gas from the solid-phase physical sorbent medium. In order to retrieve a significant portion of the arsine off of the adsorbent, very low pressures must be used. When full, the dispensing pressure might be 600 torr. When half full it will be down to about 70 torr. Most mass flow controllers are only rated down to 150 torr operating pressure. At 150 torr 60% of the arsine on the adsorbent remains on the adsorbent. Some modifications to the customer's equipment may be necessary to install the very low pressure mass flow controllers required for utilizing more than 40% of the arsine in an adsorbent type cylinder.

Valve lock arrangements provide more direct means of limiting the flow of liquid from carrier gas storage devices. U.S. Pat. No. 4,738,693 specifically discloses the use of membrane and diaphragm elements to prevent liquid discharge in the delivery of dopines for the semi-conductor industry.

The use of tubes with multiple capillary passages presents problems of forming the capillary structure into an arrangement that is suitably connected to the container that requires the flow restriction. It is known in the art to make a multi-passage capillary assembly using hollow tubes with outer hexagonal profiles. The circular holes in such a bundle are ordered with no void space in the walls. One problem with bundling of hexagonal capillaries is that the glass is typically a low melting point lead glass. Lead glass can be easily cast or shaped through a die to form the required external hex pattern. However, the low melting point of the lead glass results in a structure that is stiff and easy to shatter. Generally, the lower the melting temperature of a glass the greater the modulus of elasticity (stiffness) of that glass. Lead glass with its low melting temperature has a somewhat higher modulus of elasticity than higher melting point glasses. Therefore, for a given strain (deformation), it has higher internal stresses and is accordingly more likely to fracture. Lead glass has a further problem of chemical erosion. But the biggest disadvantage to this approach is the resultant final shape of the assembly which is a hex. Since the ends of the multi-capillary need to be attached to other parts in a gas chromatograph, the hex shape causes difficulties in getting compression type fittings to interface.

The problem of making connections to capillary structures is not a trivial one. The fine diameters of tubing and the low tensile strength of capillary column materials, such as fused silica, makes the arrangement of capillary columns and of capillary connectors for the capillary tubes especially difficult. Although many methods and procedures for making such connections are possible the connections generally require bonding to a conduit that has a circular cross-section. A suitable connection arrangement is described in U.S. Pat. No. 5,692,078.

The obvious solution is to make the outer cross section of the multi-capillary a circle for a more compatible fit to conventional compression fittings. This approach though confronts a mathematical problem that nobody has solved and that is: small circles in a larger circle do not pack in a uniform manner. This problem has presented itself in many different forms over the last several hundred years in stranded steel cables, in electrical conduits, etc. Simply put, circles packed together do not want to form an outer shape of a circle—circles packed together with the proper number of elements form hex shaped outlines.

It is a broad object of this invention to limit the release of toxic gases in the event of a valve or conduit failure.

It is an object of this invention to provide a multi-passage capillary assembly that has high ductility and a cross section compatible with the necessary fittings for sealing fluid flow through the capillary.

It is a further object of this invention to provide a multi-passage capillary assembly that provides a high degree of uniformity in the individual cross sections of the multiple capillaries and has an outer cross section of the assembly that is compatible with the necessary fittings for sealing fluid flow through the capillary passages.

A yet further object of this invention is to provide a discharge system that constrains the flow of gas during normal operation as well as during any kind of valve mishandling or valve failure.

A specific object of this invention is to provide safeguards for the delivery of arsine.

SUMMARY OF THE INVENTION

The apparatus of this invention provides a flow restriction in the storage container in the form of a tube having multiple uniformly shaped capillaries that will positively limit the discharge of gas phase fluid from the container to a low mass flow rate. The mass flow rate is typically at or above the maximum desired flow rate at which the container must supply gas to the end use device, but yet restrictive enough to severely limit any accidental discharge rate. This invention can beneficially supply fluid in any application that consumes the fluid at a relatively low rate in relation to the unrestricted discharge rate from the cylinder. The multiple fine capillary passages provide a highly useful flow restriction where variations in both the length and diameter will allow adjustment of the maximum fluid discharge rate and the multiple flow capillary passages permit continued delivery if minor amounts of impurities plug one or more of the passages. The multiple capillary flow restriction may have a location anywhere upstream of the container outlet or container valve outlet. Preferably the flow restriction has a location inside the cylinder or tank that supplies gas.

The discharge of liquids from the container poses a special hazard since the mass rate discharge of liquid will greatly exceed the mass rate discharge of the corresponding gas through the same restricted opening. Accordingly, the location of the inlet to the flow restrictor can aid in controlling fluid discharge. A particularly beneficial arrangement will locate the inlet to the flow restrictor in a manner that prevents liquid discharge from the container. In the case of arsine, the container is only filled to about 20% liquid by volume. Therefore, locating the inlet to the flow restrictor at the midpoint of the arsine cylinder prevents the discharge of liquid arsine whether the cylinder is located upside down or right side up. Further, locating the inlet at the radial center of the cylinder will prevent liquid discharge for any vertical or horizontal position of the partially filled cylinder.

Accordingly in a broad embodiment this invention is an apparatus for controlling the discharge of pressurized fluids from the outlet of a pressurized tank. The apparatus includes a container for holding a pressurized fluid in an at least partial gas phase, an outlet port for releasing pressurized gas from the container, and a gas flow path defined at least in part by the outlet port for delivering pressurized gas from the container. A restrictor in the form of a tube having multiple capillary sized passages of relatively uniform diameter is located along at least a portion of the gas flow path and restricts the outflow of gas to a minimal rate that is typically less than 100% more than the maximum gas delivery rate required from the container.

The most beneficial use of this invention incorporates the additional safeguard of a regulator that automatically limits the release of any toxic fluid delivered through the outlet of a storage container as claimed in copending application U.S. Ser. No. 062,599 filed Apr. 17, 1998. The regulator uses a condition responsive valve element at or downstream of the storage container outlet to prevent discharge of fluid unless a suitable discharge condition exists outside of the container or is imposed on the pressure regulator. The discharge condition represents a predetermined condition that is highly unlikely to occur during storage or handling of the valve under normal handling and storage procedures and at normal atmospheric conditions. Such conditions may include heating of the regulator, or imposition of an electrical current, voltage potential, magnetic field or extraordinary mechanical forces on or about the regulator. Preferably the regulator will comprise a pressure sensitive element that will prevent discharge of fluid until a preselected pressure condition, or more preferably a vacuum condition, exists downstream of the regulator. As a further safeguard the discharge condition can be specially tailored to be supplied by the end use device such that the discharge condition cannot be imposed until the container is properly positioned within or about, and safely connected to, the end use device. In this manner the invention can provide a fail safe system for delivery of toxic fluids from storage containers. The regulator may have a location upstream or downstream of the container valve. For effectiveness the container valve or the container itself will house the regulator. A location upstream of the container valve offers the most protection to the regulator and its fail safe operation.

Accordingly, in a limited apparatus embodiment this invention is an apparatus for controlling the discharge of pressurized fluids from the outlet of a pressurized container. The apparatus comprises a port body for communication with the outlet of a pressurized container to define a fluid discharge path from the container. A pressure regulator fixed in or ahead of the port body contains a valve element adapted for movement between a sealing position that blocks fluid flow through the fluid discharge path and an open position that permits fluid flow along the fluid discharge path. A diaphragm defines an interior volume isolated from the pressure condition upstream of the port body and engaged with the valve element for controlling the movement of the valve element in a manner that retains the valve element in the sealing position until a pressure differential between the inside of the diaphragm relative to the pressure outside the diaphragm moves the valve element to the open position. A tube defining multiple and uniformly sized capillary passages located along the fluid discharge path restricts the discharge of gas from the fluid outlet port to a mass flow rate of less than 5 cc per minute at standard temperature and pressure (sccm).

Additional objects, embodiments, advantages, and details of the invention are described in the following detailed description of the preferred embodiments.

BRIEF DESCRIPTION OF THE DRAWINGS

FIG. 3 is an alternate arrangement for the interior of the cylinder.

FIG. 4 is a section of FIG. 3 taken at lines 4—4.

DETAILED DESCRIPTION OF THE PREFERRED EMBODIMENTS

Figure 1:
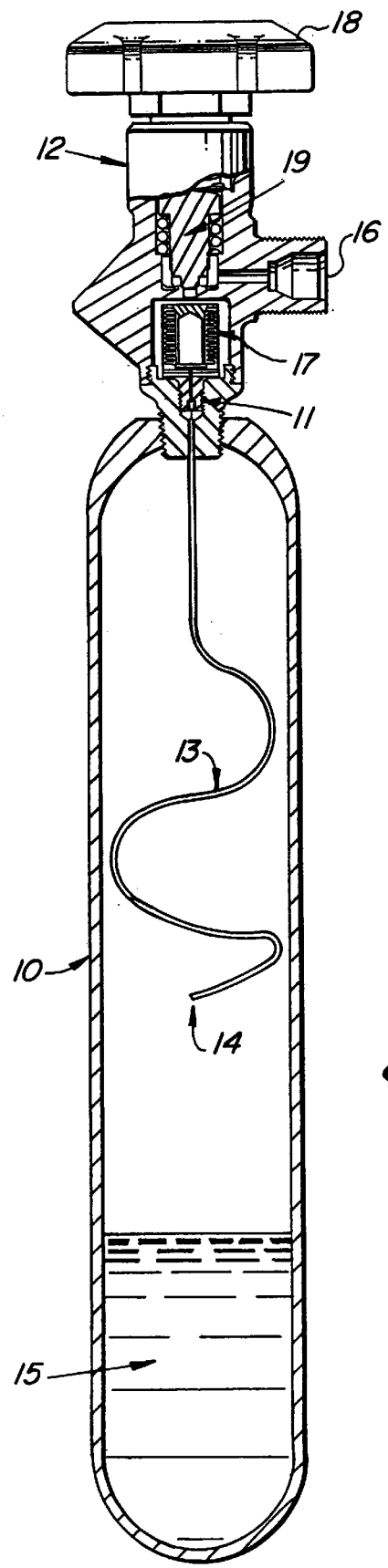
FIG. 1 is a cross-sectional view of a cylinder and head valve assembly incorporating the apparatus of this invention.

For purposes of explanation and not limitation this invention is further described in the context of the delivery of arsine gas. Looking then at FIG. 1, the invention in one form looks from the outside like a typical dispensing unit comprising a 500 cc cylinder 10 with cylinder head valve 12 at the top end and having a valve outlet 16. The interior of the cylinder contains a capillary tube 13 having an inlet 14 that supplies arsine gas to a valve inlet 11. Until exhausted, a liquid arsine reservoir 15 at the bottom of cylinder 10 replenishes the arsine gas as it leaves the cylinder and maintains the vapor pressure of the cylinder. A regulator 17, located in valve 12, contains a bellows assembly 28 that automatically controls the discharge of arsine gas from the cylinder. A handle 18 allows manual control of a main valve element 19.

Figure 2:
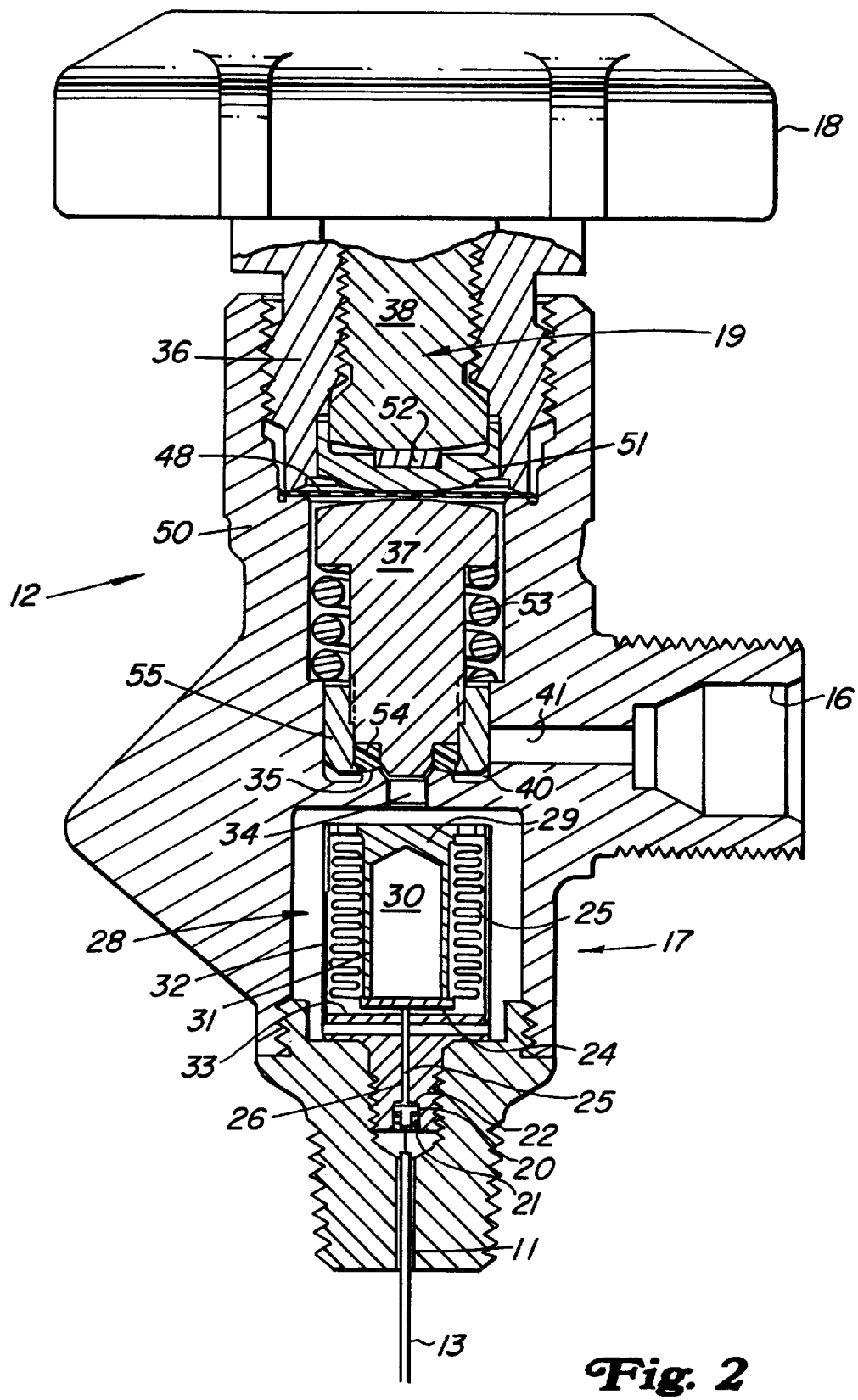
FIG. 2 is an enlarged view of the cylinder head assembly.

FIG. 2 shows regulator 17 and the internals of head valve 12 in more detail. Following then the path of the arsine gas out of head valve 12, the gas first enters through a tube 13 into valve inlet 11. Tube 13 contains multiple capillary passages of uniform size, similar to those depicted in FIG. 4. The body of head valve 12 contains the regulator 17. Entering gas first contacts a valve element in the form of poppet valve 20. A spring 21 biases poppet valve 20 against a valve seat 22 to create a closed condition along the gas flow path. Spring 21 normally presses poppet valve 20 against valve seat 22 until the diaphragm element of the regulator, in the form of a bellows 23, expands to displace a contact plate 24. Contact plate 24 acts on a control pin 25 that pushes poppet valve 20 away from valve seat 22. Arsine gas may then flow through pin passage 26 around pin 25 and into a bellows chamber 27 that houses the bellows assembly 28.

Bellows assembly 28 consists of a bellows guide 29 that defines an internal pressure chamber 30 having walls 31 that support the inside of bellows 23; an outer sleeve 32 that surrounds the exterior of bellows 23; and a bottom guide plate 33. Sealing contact at the upper end of the bellows 23 with bellows guide 29, and at the lower end of the bellows with contact plate 24, isolate the bellows from pressure within chamber 27 and the gas flow path in general. Internal chamber 30 is typically sealed at atmospheric pressure such that a reduction in pressure within bellows chamber 27 causes the gases in bellows chamber 30 to expand bellows 23 and urge contact plate 24 downward against pin 25. Bellows guide 29 retains sleeve 32 about its outer edge. Sleeve 32 positions with guide plate 33. Together, bellows guide 29, sleeve 32 and guide plate 33 protectively enclose bellows 23. Pin 25 passes through a central hole in the guide plate 33 to maintain its alignment with contact plate 24.

Arsine gas that passes out of bellows chamber 27 flows through a valve inlet port 34 and across sealing surfaces 35. Threaded bushing 36 clamps a multi-layer metallic diaphragm 48 to valve body 50 thereby forming a positive seal against fluid leaking past the valve stem 38. Handle 18 operating in conjunction with threaded valve stem 38, forces piston 51 via friction pad 52 onto diaphragm 48 to move the main valve plunger 37 down against the resisting force of spring 53. Downward movement of plunger 37 forces a Teflon sealing element 54, retained by nut 55, onto valve body 50 to create a seal at surfaces 35. Backing valve stem 38 away from diaphragm 48 allows spring 53 to force valve plunger 37 up, thereby separating the sealing surfaces 35 and permitting gas to flow through port 34. Once past sealing surfaces 35 arsine gas flows from a chamber 40 to an outlet port 41 and to the valve outlet 16.

This regulator arrangement 17 can be set to reliably prevent opening of the poppet valve 20 until pressure within the valve body drops to a vacuum condition. This condition is usually equal to 500 torr or less. With this setting of the regulator, opening of the main valve, with or without the protective cap in place, would not dispense arsine from the cylinder. Since the typical end-user's apparatus operates at pressure less than 100 torr, dispensing arsine at a vacuum, and particularly at pressures of 500 torr or less, has several distinct advantages. For instance there is a negative pressure at all of the arsine gas connections, so leaks can only leak into the end-user apparatus where they are quickly detected by the apparatus itself. Thus, one does not have to check joint by joint to verify that there are no leaks. In addition no external pressure regulators are required for reducing the tank pressure to pressures acceptable to the mass flow controllers. More importantly, an accidental opening or failure of a pipe connection in the arsine system is orders of magnitude less hazardous in a vacuum operated system than in a pressure operated system.

The use of the restricted flow passage further increases safety in the unlikely event that regulator 17 fails to check gas flow when desired. The uniformly sized capillary passages offer the most flexibility and reliability as the flow restrictor. The multiple small diameter bores will desirably limit the transport of gas phase fluids to very low rates while permitting the higher flow of liquids at higher flow mass rates due to their higher density. The capillaries of the restrictor will typically limit the discharge of fluid to not more than 10 sccm and more preferably to less than 5 sccm.

Looking again at FIG. 1 to more fully explain this form of the flow restrictor, capillary tube 13 provides the only exit from cylinder 10. The winding formation of capillary tube 13 maintains inlet 14 near the axial and radial center of cylinder 10. The internal diameter of the capillaries will ordinarily not exceed 20 micrometers. For a single capillary, this diameter limits the rate that the 250 psi saturation pressure of arsine can force arsine through the tube to only 60 milligrams per minute. Typical end-users require only 3 to 10 milligrams per minute (1 to 3 sccm). At the 60 milligram rate it would take 40 hours for the container to empty. It would take one hour for a 30 by 30 room with 10 foot ceilings to reach the arsine Immediate Danger To Life and Health (IDLH) level. One hour should provide ample time for alarms to warn personnel to exit and response teams take necessary action. Therefore, the diameter of the multiple capillaries will ordinarily be less than 20 micrometers.

As mentioned, the length as well as the diameter of the capillary may be adjusted to provide a maximum desired flow rate through the restriction. In the case of arsine delivery at the previously mentioned rates, the capillary is typically 15 cm long. For that length, it would require four capillaries in parallel with a diameter of about 9 micrometers to provide about the same flow capacity. The multiple capillary passages in the restriction tube of this invention may be as small as 2 microns. However the size of the capillary passages will usually be set to use not more than 19 and not less than 7 capillary passages to provide numerous passages while still allowing gas release under reasonable pressures.

A useful feature of this invention is the provision of the essentially round outer cross section of the tube with the relatively uniform internal capillary passages. The internal open flow area through the tube will be defined almost entirely by the regular capillaries, i.e. those with cross sections in the form of the same regularly recurring shape. The regular capillaries preferably have a round cross section. The roundness of the individual capillary passages may be defined by the variation in diameter, taken along any two lines of direction across the substantially circular cross section of each capillary passage, not exceeding 15%. The uniformity of the different uniform capillary passages may be defined by the variation in average diameter between capillaries not exceeding 15%. Any remaining flow area through the tube is typically in the form of irregular capillary sized passages having individual cross sectional areas that are less than the individual cross sectional areas of the regular capillary passages. Typically the irregular capillaries will have an average cross sectional area that equals 50% or less of the average flow area of the regular capillaries. The relatively small diameter of the irregular capillaries minimizes the detrimental effect that the presence of the irregular capillaries may have on the regulation of the flow rate through the restrictor.

The preferred structure of this invention is a uniform multi-capillary assembly that virtually eliminates the presence of irregular capillaries. In this preferred structure the internal open area defined by regular capillaries will equal at least 95% and more preferably at least 99% of the total internal open area through the assembly. The most preferred form of this structure eliminates all irregular capillaries. Furthermore, any irregular capillaries that are found in the preferred structure will have minimal affect. Any such irregular capillary will have an open area equal to 10% or less than the open area of any regular capillary.

The outer wall and the inner walls of the multicapillary assembly may be made from any material that is suitably formed into the required structure. Thus the resulting capillary structure has an operating temperature that is limited by the stability or transition temperature of the material defining the capillaries. Capillaries of this size may be made from various glass materials. Drawing techniques used for forming glass fibers and tubes lend themselves most readily to the production of the tube structure of this invention. Suitable glass materials include lead silicate, borosilicate, conventional glasses (soda lime silicate), and other forms of high purity silica such as quartz or fused silica. A particularly preferred glass material is an alumino-silicate.

A variety of suitable capillary structures may be created. The capillary structure may be wound as shown in FIG. 1 to provide extra length. Alternately, FIG. 3 shows a tank that uses a modified form of a capillary defined by a straight capillary tube arrangement 13' with its inlet 14' centered at the radial and axial midpoint of cylinder 10.

As also shown by FIG. 4, the thickness of the glass wall relative to the capillary diameter may be made quite large to overcome any fragility of the glass. Proper containment can further overcome any fragility of glass. As shown more clearly by the cross-sectional view in FIG. 4, tube 46 preferably defines a hexagon arrangement of six capillary passages 43 that surround a central capillary passage 44 and wherein all of the capillaries have the same relatively smaller diameter with respect to the inside diameter of the glass tube 46.

Once formed, an outer sleeve may surround the tube to provide additional support and structural integrity. Metallic materials will work well as outer sleeves. An optional metal tube 42, typically constructed from stainless steel when provided, may protectively surround the glass tube 46. Metal tube 42 adds further rigidity and durability when optionally shrunk around tube 46 to provide a reinforced unit. With the optional reinforcement of metal tube 42, fracture of the glass tube would again leave the function of the restricted flow path through capillary arrangement 13' substantially unchanged. An especially beneficial arrangement may shrink a metallic sleeve around a glass multi-capillary assembly to compress the tube into the sleeve. An arrangement of this may provide the needed structural support for imposing the necessary ultra-high pressures that are required to push many fluids through capillaries that approach 2 micrometers in diameter.

This invention uses a forming method that readily provides the assembly of the structure of this invention and in particular the uniform multi-capillary assembly of this invention. The method forms the multi-capillary tube or conduit with a substantially circular perimeter that surrounds a plurality of regular capillary passages defined by internal walls within an outer wall. The method starts with inserting a plurality of smaller conduits into a surrounding tube to form a tube and conduit assembly. The conduits may be formed by drawing down the tube stock to the desired conduit size. The number of inserted conduits will correspond with the number of regular capillaries obtained by the forming method. Common openings of the conduits are sealed about one end of the tube and conduit assembly to form a drawing stock having a closed end about which all conduits are sealed from fluid flow and an opposite open end about which all conduits are open for fluid flow. The drawing stock is then heated to a softening temperature in a suitable drawing apparatus. Simultaneously drawing the heated drawing stock while restricting fluid flow from the open conduit ends of the drawing stock reduces the interiors of the conduits to capillary size while preventing collapsing closure of the conduit interiors. A multi-capillary tube that has a number of capillary passages substantially equal to the number of conduits may be recovered from the stretched and cooled drawing stock. In many cases the reduction of the diameter of the conduits during the drawing of the heated drawing stock provides sufficient reduction in the diameter at their open ends to suitably restrict gas flow out of the interiors of the conduits to a rate that maintains the desired final diameter of the capillary passages formed from the conduits.

Preferably the conduits will again have a round cross section. Prior to drawing, the conduits in the tube and conduit assembly will preferably have a diameter in a range of from 0.5 to 1 mm and a wall thickness of from 100 to 300 micrometers. The multi-capillary assembly will usually contain at least 7 regular capillary passages. The thickness of the outer tube will usually average from 1 to 10 mm. The inner diameter of the outer tube will be determined by the number and outer diameter of the inner conduits. The most effective packing arrangement for the inner conduit has been found to be a number of circular rings of conduits that surround a central conduit. Jacques Dutka, in Machinery Journal, October 1956, gives the maximum number of small circles that may be packed into a larger circle for a number of different packing arrangements. Based on these formulas it has been found that for this invention the typical number of total passageways in a given number of passageway rings is best given by the formula for maximizing circles as presented in the foregoing reference. Therefore, where the desired arrangement for round conduits is as an assembly of rings about a central tube, the number of conduits in the assembly is determined by:

$$N=3n^2+3n+1;$$

where,

N=the total number conduits, and n=the number of rings of conduits around the central conduit.

Where all of the inner conduits have the same outer diameter the preferred inner diameter of the outer tube is calculated in terms of a "K" factor defined by the above reference. Accordingly the outer tube has an inner diameter "D" determined by the outer diameter "d" of the inner conduits where:

$$D=K*d$$

The factor K varies mathematically with the number of inner conduits. Values for K are set forth in the above reference. Examples of specific "K" values are set forth in Table 1 for arrangements that wrap rings of conduits around a central conduit.

TABLE 1

| # of inner conduits | I.D. of Outer tube |
|---|---|
| 2–7 | 3 |
| 8–13 | 4.465 |
| 13–19 | 5 |
| 20–31 | 6.292 |
| 32–37 | 7.001 |
| 38–43 | 7.929 |
| 44–55 | 8.212 |

An important parameter when seeking to minimize irregular channel formation is temperature uniformity during the drawing process. It has been found that the drawing apparatus should not permit substantial temperature variations during the drawing operation. Temperature variations should be held to less than 5° C. over the length of the draw. A number of other forming techniques and material properties can be important to obtaining a uniform multi-capillary structure. Drawing the structure from conduits that themselves have very uniform bores and walls enhances the uniformity of the resulting structure. Uniformity of the individual conduits may be enhanced by drawing the starting conduits down in several stages from large conduits. Uniformity of the resulting capillaries also improves as the alignment of the conduits in the drawing stock becomes more parallel. For a glass material comprising aluminosilicate glass the glass melting point used in the draw is typically 1120° C. The starting conduits have their top ends capped to inhibit gas flow in the tubing. This prevents the tubes from collapsing and forming a solid rod during the drawing process. The structure for the drawing stock is assembled one row of conduits at a time using glue or rubber bands to hold each row in place. The assembly is mounted in the drawing tower and allowed to slowly equilibrate at the softening temperature of the glass. This begins to establish the surface forces on the initial part of the assembly and corrects for slight packing errors. The tip of the preform is then dropped and a tractor is used to draw the preform structure from the furnace. The drawing furnace is usually operated at a top feed rate of 1 mm/min, a bottom feed rate of 190 mm/min with a helium carrier gas flow of 6 L/min and a furnace temperature of 983° C. Capillaries of other sizes may be produced in varying numbers using the same formula and similar techniques. Additional details of drawing multiple capillary tubes is disclosed in the copending application 067,109, filed, Mar. 27, 1998, the contents of which are incorporated by reference.

Where the capillary is the only entrance, arsine for filling the cylinder must enter through the capillary size opening. Cylinder filling normally requires the pumping of liquid arsine into the cylinders. Liquid arsine has a density about 500 times greater than gaseous arsine. Consequently for most liquid-fill, gas-withdrawal systems, filling will take orders of magnitude less time than the emptying of the cylinder.

In applications where fill time needs reduction, a larger port dedicated exclusively to cylinder filling may reduce times for recharging cylinders when desired or necessary for filling/delivery of other gas/gas or fluid/gas systems. In such arrangements the cylinder or valve may contain a separate entry port that by-passes the capillary or other flow restriction. Flow into the by-pass port may be controlled by a pressure, electrical or magnetic, or mechanical means to mention only a few possibilities.

It is also possible to fill the cylinder by using a displaceable restriction. Such a system is disclosed in copending provisional application 60/044107 filed Apr. 24, 1997. In this arrangement a filter element that can serve as a restriction element reciprocates between different positions, one for filling the container and another for withdrawing gas from the container. In the case of a restrictor, it may be in the form of a sealing body wherein the sealing body is adapted for displacement away from the seal surface to establish a fluid flow path from the container that inhibits fluid flow through the valve body and for displacement toward the seal surface to establish a fluid flow path from the container to the valve outlet port that passes fluid through the restrictor and restricts fluid flow from the container. In this manner a single port may be used to move fluid in and out of the container at automatically differing rates. The use of a single port through the tank inlet permits the port to have a large flow area through the narrow neck of most containers that facilitates filling of the tank with gases. A displaceable restrictor element may further incorporate valve sealing elements that move with the restrictor element to block any discharge of gas unless the restrictor is fully in contact with the seal surface.

What is claimed is:

1. An apparatus for controlling the discharge of pressurized fluids from the outlet of a container, the apparatus comprising:
    a container for holding a pressurized fluid in an at least partial gas phase;
    an outlet port for delivering pressurized fluid from the container;
    a fluid flow path defined at least in part by the outlet port for delivering pressurized fluid from the container; and,
    a flow restrictor in the form of a tube defining multiple capillary passages along at least a portion of the fluid flow path.

2. The apparatus of claim 1 wherein the flow restrictor defines at least seven capillary passages.

3. The apparatus of claim 1 wherein the capillary passages have an essentially round cross section and the variation in diameter of individual capillary passages, taken along any two lines of direction across the substantially circular cross section of each capillary passage, does not exceed 15%.

4. The apparatus of claim 1 where the capillary passages have an essentially round cross section and the variation in diameter of different capillary passages does not exceed 15%.

5. The apparatus of claim 1 wherein the restrictor limits the flow of the gas contained in the cylinder to less than 10 sccm.

6. The apparatus of claim 1 wherein the tube is located within the container.

7. The apparatus of claim 6 wherein the tube defines an inlet located at about the axial midpoint of the container.

8. The apparatus of claim 7 wherein the tube locates the inlet at about the radial midpoint of the container.

9. The apparatus of claim 1 wherein the multiple capillary passages have an internal diameter that does not exceed 0.2 mm.

10. The apparatus of claim 1 wherein the tube comprises a glass conduit and a protective sleeve surrounds the glass conduit.

11. A cylinder and a valve assembly for containing pressurized fluid and controlling the discharge of pressurized fluids from the cylinder, the cylinder and valve assembly comprising:
    a cylinder defining a cylinder opening;
    a port body adapted for sealing engagement with the cylinder opening;
    a fluid inlet port defined by at least in part by the port body and located within the cylinder;
    a fluid outlet port defined by the port body and located outside the cylinder;
    a fluid discharge path defined by the port body between the fluid inlet port and the fluid outlet port;
    a manually operated shut off valve for controlling fluid flow along the fluid discharge path; and,
    a flow restriction along the fluid discharge path in the form of a tube defining at least seven capillary passages along at least a portion of the fluid discharge path for restricting the discharge of fluid from the fluid outlet port to a mass flow rate of less than 5 sccm.

12. The apparatus of claim 11 wherein the capillary passages have an essentially round cross section, the variation in diameter of individual capillary passages, taken along any two lines of direction across the substantially circular cross section of each capillary passage, does not exceed 15% and the variation in diameter of different capillary passages does not exceed 15%.

13. The apparatus of claim 11 wherein each of the at least seven capillary passages have an internal diameter that does not exceed 0.2 mm.

14. The apparatus of claim 11 wherein the tube is located within the cylinder and defines an inlet located at about the axial and radial midpoint of the cylinder.

15. The apparatus of claim 11 wherein the tube comprises a glass conduit and a protective sleeve surrounds the glass conduit.

16. The apparatus of claim 11 wherein the cylinder and valve assembly comprise an automatic valve containing a valve element biased into a sealing position that blocks fluid flow along the fluid discharge path and a sealed bellows located downstream of the valve element along the fluid discharge path, the sealed bellows having one portion fixed with respect to the port body and another portion operably linked to the valve element to move the valve element to an open position when relative pressure between the interior and exterior of the bellow expands the bellows and wherein the open position permits fluid flow along the fluid discharge path.

17. The apparatus of claim 16 wherein the port body defines a bellows chamber that houses the bellows.

18. The apparatus of claim 17 wherein the bellows is adapted to move the valve element to an open position in response to a vacuum condition in the bellows chamber.

19. The apparatus of claim 18 wherein the valve element comprises a poppet valve.

* * * * *